(12) United States Patent
Jun et al.

(10) Patent No.: US 7,039,652 B2
(45) Date of Patent: May 2, 2006

(54) SYSTEM AND METHOD FOR PROVIDING INDEX DATA OF MULTIMEDIA CONTENTS

(75) Inventors: Sung Bae Jun, Seoul (KR); Kyung Ro Yoon, Seoul (KR); Chan Eui Cheong, Seoul (KR); Ji Eun Lee, Seoul (KR); Hee-Youn Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 09/863,296

(22) Filed: May 24, 2001

(65) Prior Publication Data

US 2001/0047379 A1   Nov. 29, 2001

(30) Foreign Application Priority Data

May 24, 2000   (KR) .............................. 2000-28098

(51) Int. Cl.
  *G06F 7/00*   (2006.01)
  *G06F 15/16*  (2006.01)
(52) U.S. Cl. ..................... 707/104.1; 709/203; 707/10
(58) Field of Classification Search ............ 707/104.1, 707/10; 709/203
  See application file for complete search history.

(56) References Cited

U.S. PATENT DOCUMENTS

| | | | | |
|---|---|---|---|---|
| 5,483,276 A | * | 1/1996 | Brooks et al. ................ 725/10 |
| 5,625,404 A | * | 4/1997 | Grady et al. ................. 725/114 |
| 5,790,176 A | * | 8/1998 | Craig .......................... 725/115 |
| 5,802,283 A | * | 9/1998 | Grady et al. ................. 709/227 |
| 5,872,588 A | * | 2/1999 | Aras et al. ..................... 725/14 |
| 5,930,493 A | * | 7/1999 | Ottesen et al. ................ 725/92 |
| 6,018,744 A | * | 1/2000 | Mamiya et al. .......... 707/104.1 |
| 6,360,234 B1 | * | 3/2002 | Jain et al. ................. 715/500.1 |
| 6,526,580 B1 | * | 2/2003 | Shimomura et al. .......... 725/63 |
| 2002/0129140 A1 | * | 9/2002 | Peled et al. ................. 709/224 |
| 2002/0146233 A1 | * | 10/2002 | Barton et al. ................. 386/46 |
| 2002/0161747 A1 | * | 10/2002 | Li et al. ......................... 707/3 |
| 2002/0170062 A1 | * | 11/2002 | Chen et al. .................... 725/86 |

* cited by examiner

*Primary Examiner*—Greta Robinson
*Assistant Examiner*—Kuen S. Lu
(74) *Attorney, Agent, or Firm*—Fleshner & Kim, LLP

(57) ABSTRACT

A system and method for providing index data service of multimedia contents are disclosed, wherein the system comprises: a data server system for providing multimedia data services through a wire or wireless line; an index server system for receiving streams from the data server system, extracting index data of the streams, and providing the extracted index data to a subscriber equipment; and the subscriber equipment for recording and playing the multimedia data from the data server system in real time and providing a user interface that can perform nonlinear search and browsing using the index data provided from the index server system.

22 Claims, 3 Drawing Sheets

SYSTEM AND METHOD FOR PROVIDING INDEX DATA OF MULTIMEDIA CONTENTS

BACKGROUND OF THE INVENTION

1. Field of the Invention

The present invention relates to a system and method for providing index data of multimedia contents.

2. Discussion of the Related Art

With the development of cable TVs and digital TV environments, multimedia data provided to users have increased. Under the circumstances, users want to selectively obtain data suitable for them. To this end, there is provided a method for providing program services to users through an Electronic Program Guide (EPG). The EPG is used to recommend contents suitable for users using user preference because it provides data for each unit of program. This is recognized as a user interface important for multimedia contents browsing.

However, the EPG and a method for searching and browsing data using the same have a drawback that it is difficult to satisfy users' request, who want to obtain desired data only within a program. For example, users may want to browse economic news only when viewing news video, may want to view only a scene showing a specific character in a talk show, or may want to browse only a specific section in a show program.

Furthermore, the users may want to browse a highlight of a short amount to determine whether to view the whole program of drama or sports. The existing EPG cannot satisfy the users' request who want search and browsing at a more detailed level. Such search and browsing services are available under the circumstances that structural/semantic/summarized data of multimedia streams are provided.

There is provided a non-linear browsing method which selectively browses only a desired portion of multimedia streams without sequentially browsing the multimedia streams. The non-linear browsing method is very useful because it can provide users with desired data only within a short time.

A video indexing technique is required to provide users with desired multimedia contents at a desired time, or quickly browse or search a desired portion only of multimedia streams.

The video indexing technique includes a portion to be automated and a portion not to be automated. In other words, detection of shot, selection of key frame, extraction and recognition of text, recognition of speaker, and detection of key word correspond to the portion to be automated. Detection for each unit of event, detection for each unit of logical scene, detailed description of scene, summarization of story for each unit of section, and creation of highlight correspond to the portion not to be automated, and even though these services are to be automated, it is difficult to provide services at a desired level of users. Accordingly, for semantic search and browsing at a desired level of users, development of a semi-automated system in which an automated system is combined with a manual indexing system is required.

Generally, there is supposed a scenario in which contents manufacturers provide video indexing data together with contents through automated technique and manual indexing. However, such a scenario is not being actually realized because it is difficult to obtain economic profit more than investment cost of an index data provider who provides index data using the video indexing technique.

Recently, with development of a set top box, such as Tivo or Replay TV, that can record and play broadcasting contents, users can store broadcasting contents while recording them. Accordingly, users can again view contents skipped during their absence and can use recorded data like as a video tape.

Furthermore, manufacturers and distributors of the set top box generally operate an EPG server to recommend a channel by considering user preference. Such a system is called a personal digital recorder (PDR) and it is expected that such a TV set will be developed as a general TV system. The PDR is used for both an analog TV and a digital TV. In view of international standard activity, MPEG-7 and TVAnytime have relation with the PDR or the video indexing technique.

The MPEG-7 standardizes a data format for efficient search and browsing of multimedia streams or summarization thereof. The TVAnytime aims to provide services that can browse desired contents at a desired time of the users.

With development of the above base techniques, it is possible to provide a function that can record broadcasting streams and browse only a desired portion of the recorded broadcasting streams at a desired time.

To this end, there are provided two methods. The one method is to provide indexed data from a broadcasting station or a multimedia server, while the other method is to automatically extract index data of multimedia streams from a subscriber equipment.

The method for providing indexed data from a broadcasting station or a multimedia server will now be described.

Although a multimedia server system such as a broadcasting station can easily provide index data of multimedia streams, it is difficult to provide index data service due to an economical reason.

If the index data of the multimedia streams are provided, advertising revenue that is a main income source of a multimedia server may be reduced due to indexing of advertisement portions interposed between programs or advent of programs that can easily detect advertisement portions. It is not expected that positive economical effect can be obtained as compared with the cost related to manpower and a system for providing index data. Accordingly, it is difficult for a multimedia server such as a broadcasting station to provide index data service.

The method for automatically extracting index data of multimedia streams from a subscriber equipment will be described below.

A research of a system for automatically extracting index data from a subscriber equipment, storing and searching the index data is in progress. In such a system, indexing should be performed while broadcasting data are recorded, and all data to be indexed should automatically be processed for user's convenience.

In brief, it is necessary to provide index data of a simple level considering processing ability of a subscriber equipment in an indexing engine. Since it is difficult to extract semantic elements on broad contents due to limited technical conditions, it is impossible to provide various functions of users' desired level.

In other words, the related art EPG method can provide data for each unit of program but does not provide data on a section within a program. Accordingly, the EPG method cannot be used for search and browsing of non-linear multimedia streams. Although a multimedia server such as a broadcasting station can provide index data of users' desired level, it is actually difficult to provide such index data due to economical reason. Also, it is difficult for a subscriber equipment to generate index data due to technical limitation in a portion to be automated and limited processing ability of the subscriber equipment.

Accordingly, to provide index data that reflects users' request, index data service by an index server is essentially required.

SUMMARY OF THE INVENTION

Accordingly, the present invention is directed to a system and method for providing index data of multimedia contents to subscribers that substantially obviates one or more of the problems due to limitations and disadvantages of the related art.

An object of the present invention is to provide a system and method for providing index data of multimedia contents to subscribers, in which index data of multimedia contents provided from multimedia contents providers such as broadcasting stations or cable TVs are extracted and provided to subscriber equipments.

Another object of the present invention is to provide a system and method for providing index data of multimedia contents to subscribers, in which subscribers can selectively obtain, search, and browse their desired data only.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a system for providing index data of multimedia contents to subscribers according to the present invention comprises a data server system of a multimedia contents provider for providing multimedia data to subscribers, an index server system for receiving streams transferred from the data server system to subscribers, extracting index data from the received streams and providing the extracted index data to a subscribers, and a subscriber equipment for real time recording and playing the multimedia data received from the data server system and providing a user interface to perform non-linear search and browsing using the index data provided from the index server system.

The index data extracted from the index server system are structural, semantic and summary data of the multimedia streams described based on temporal data.

The structural data of the multimedia streams includes shot or scene data described based on temporal data.

The semantic data of the multimedia streams are information on appearance or disappearance of objects, transition of background, occurrence and termination of event, semantic data of each section within the streams, or state of the object, wherein those information are described based on temporal data.

The summary data of the multimedia streams include information on key frame or highlight data or segment data related to summary/detail relationship or cause/result relationship between segments or between events, wherein those information are described based on temporal data.

The index server system includes at least one indexing engine having a program therein for automatically extracting the index data, and an interface means for manually or semi-automatically extracting the index data by an operator.

The index server system includes a transmitting means for transmitting the index data to the subscriber equipment.

The index server system includes an encoder that encodes the index data to provide only permitted users with the index data, and the subscriber equipment includes a decoder that decodes the index data received from the index server system.

To further achieve these and other advantages and in accordance with the purpose of the present invention, as embodied and broadly described, a method for providing index data of multimedia contents to subscribers according to the present invention comprises: receiving multimedia streams from a data server system of a multimedia contents provider, extracting the index data of the multimedia streams provided from the data server system of the multimedia contents provider, and providing the index data extracted from the index server system to subscriber equipments.

The index data provided from the index server system to the subscriber equipment are structural, semantic or summary data of the multimedia streams described based on temporal data.

The structural data of the multimedia streams includes shot or scene data described based on temporal data.

The semantic data of the multimedia streams include information on appearance or disappearance of objects, transition of background, occurrence and termination of events, semantic data of each section within the streams or state of the objects, wherein those information are described based on temporal data.

The summary data of the multimedia streams include information on key frame or highlight data or segment data related to summary/detail relationship or cause/result relationship between segments or between events, wherein those information are described based on temporal data.

The index data are extracted in real time for multimedia streams provided from the data server system of the multimedia contents provider to the subscriber equipment.

The step of extracting the index data in the index server system includes the steps of providing the multimedia streams received from the data server system of the multimedia contents provider to the subscriber equipment in real time, so that the extracted index data are provided to the subscriber equipment in a predetermined time.

The data server system of the multimedia contents provider provides the multimedia streams to the index server system before providing them to the subscriber equipment, and the index server system extracts the index data for the multimedia streams provided in advance and provides the extracted index data to the subscriber equipment before broadcasting time or at the broadcasting time.

The index data are provided to the subscriber equipment upon request of the subscriber equipment accessed to the index server system.

In the system and method for providing index data of multimedia contents according to the present invention, only user-requested index data can be non-linearly searched and browsed within a program without providing data for each unit of program provided by the existing EPG server.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
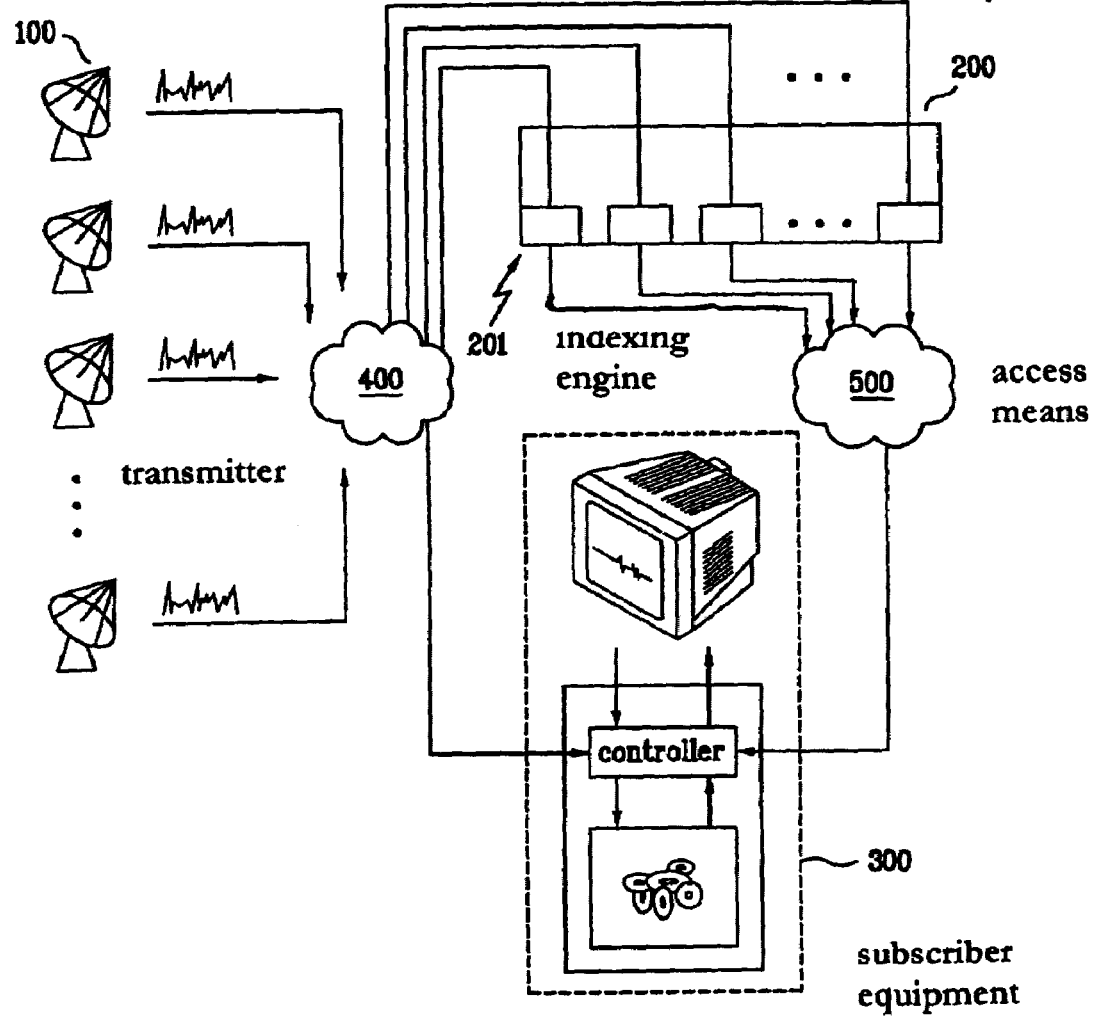
FIG. 1 shows a system for providing index data of multimedia contents.

FIG. 1 shows a system for providing index data of multimedia contents. Referring to FIG. 1, the system for providing index data of multimedia contents includes a data server system 100, an index server system 200, and a subscriber equipment 300. The data server system 100, such as a broadcasting station, provides multimedia data services. The index server system 200 receives streams from the data server system 100, indexes structural, semantic or summary data of the received streams to extract index data, and provides the extracted index data to the subscriber equipment 300. The subscriber equipment 300 can record and play the data received from the data server system 100 in real time and stores the index data provided from the index server system 200. The subscriber equipment 300 can also perform nonlinear search and browsing of the stored index data.

The data server system 100 is a system that transmits analog or digital streams. The subscriber equipment 300 has its own functions of a device such as Tivo or Replay TV that can simultaneously record and play the existing digital or analog streams. Also, the subscriber equipment 300 receives the index data from the index server system 200, and stores and searches the received index data.

The index server system 200 includes at least one indexing engine 201 to respectively index multimedia streams provided form the data server system 100 for each broadcasting station (channel).

At this time, a key interface of an operator is respectively provided in the index server system 200 or the indexing engine 201 to automatically, semi-automatically, and manually extract the index data.

Furthermore, there is provided a transmitter 400 that provides multimedia streams from the data server system 100 for each broadcasting station to the index server system 200. The transmitter 400 may be a wireless means such as broadcasting based on a frequency band to provide multimedia streams to the subscriber equipment 300. Alternatively, the transmitter 400 may be a separate network such as Internet.

There is further provided an access means 500 that provides the index data from the index server system 200 to the subscriber equipment 300. The access means 500 may be a wireless means of a general broadcasting type. Alternatively, the access means 500 may be a separate network.

In the embodiment of the present invention, by receiving the multimedia streams (broadcasting streams) transferred from the data server system 100 of the broadcasting station to each subscriber equipment 300, the index server system 200 indexes the broadcasting streams received from each broadcasting station to extract index data and provides the extracted index data to the subscriber equipment 300.

The index data provided from the index server system 200 include structural data, semantic data, and summary data.

The structural data of the multimedia streams include data of shot or scene in the multimedia streams, which are described based on temporal data.

The semantic data of the multimedia streams include information on appearance or disappearance of objects, transition of background, occurrence and termination of event, semantic data of each section within the streams, and state of the object, which are described based on temporal data.

The summary data of the multimedia streams include information on key frame or highlight data, or segment data related to summary/detail relationship or cause/result relationship between segments or between events, which are described based on temporal data.

Figure 2:
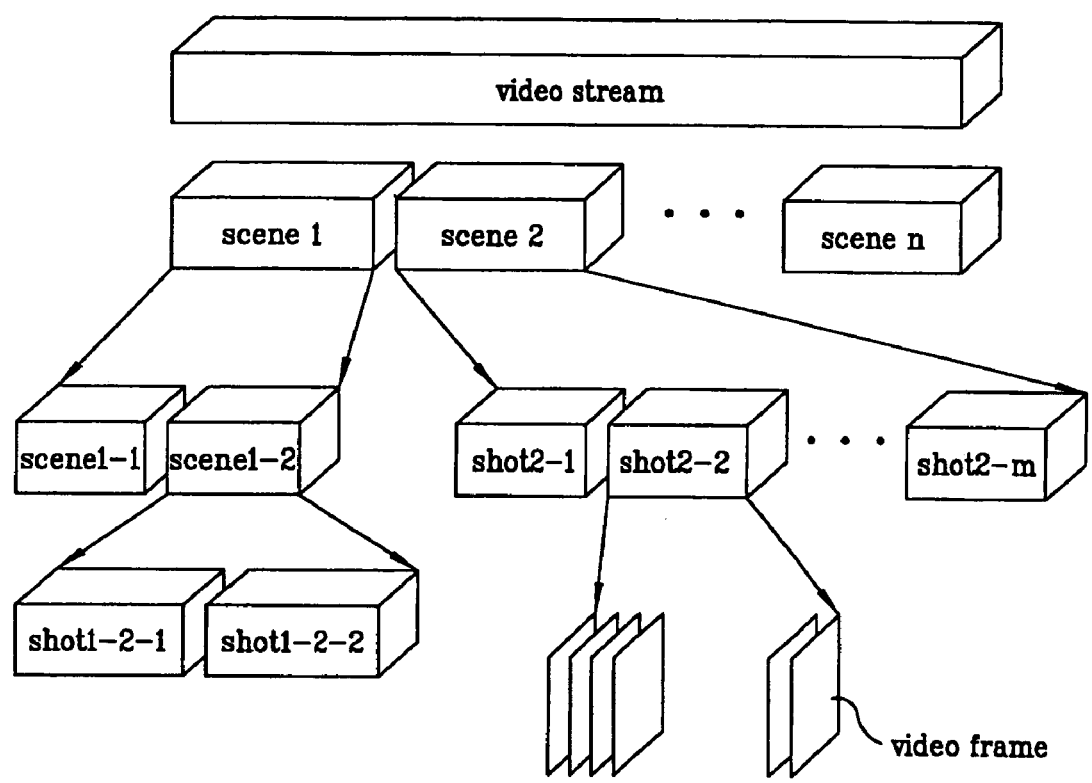
FIG. 2 shows an example of structural data of multimedia streams.

FIG. 2 shows an example of structural data of the multimedia streams.

Methods for extracting index data by the index server system 200 and performing search and browsing in the subscriber equipment 300 based on the extracted index data can be introduced from the following patent applications filed by the applicant of the present invention:

(a) Korean Patent Application No. 2000-12489 titled "METHOD FOR NON-LINEARLY PLAYING MULTIMEDIA STREAMS AND BROWING INTERFACE, CONTROL SYSTEM, AND INPUT DEVICE";

(b) Korean Patent Application No. 2000-11565 titled "VIDEO BROWSING SYSTEM BASED ON SYNTHETIC KEY FRAME";

(c) Korean Patent Application No. 199941134 titled "METHOD FOR CONSTRUCTING SUMMARY/DETAIL RELATIONSHIP DATA BETWEEN SEGMENTS OF MULTIMEDIA STREAMS AND VIDEO BROWSING METHOD BASED ON SUMMARIZED/DETAILED DESCRIPTION RELATION DATA";

(d) Korean Patent Application No. 1999-3015 titled "METHOD FOR CONSTRUCTING MULTISTAGE SUMMARY SEGMENT DATA SCHEME OF MULTIMEDIA STREAMS, METHOD FOR GENERATING SUMMARY STREAM FROM THE MULTISTAGE SUMMARY SEGMENT DATA SCHEME, AND BROWSING/RECORDING/EDITING DEVICE OF MULTISTAGE SUMMARY STREAM PROVIDED BY THE METHOD"; and (e) Korean Patent Application No. 1999-45943 titled "METHOD FOR PROVIDING USER ADPATIVE MULTISTAGE SUMMARY STREAM".

In the above index server system 200, at least one indexing engine 201 is essentially required to index respective streams. For semi-automatic indexing, one or more operators correct the index data provided by the indexing engine 201 in real time or index other semantic data not provided by the indexing engine 201.

In the index server system 200, the multimedia streams provided from the data server system 100 or indexed data of the multimedia streams are stored in a nonvolatile memory to be used later.

In receiving broadcasting streams from each broadcasting station, the index server system 200 may receive the broadcasting streams provided from the subscriber equipment 300 in real time to extract the index data. Alternatively, the index server system 200 may receive the broadcasting streams before the broadcasting streams are provided to the subscriber equipment 300, i.e., before broadcasting, to extract the index data.

At this time, the data server system 100 of the broadcasting station can provide the multimedia streams (broadcasting streams) to the index server system 200 through the transmitter 400 such as a separate network or a storing means such as a video tape for each unit of program.

Under the circumstances, the index server system 200 in advance extracts the index data to provide the index data before broadcasting or at the time of broadcasting.

The subscriber equipment 300 that obtains the index data from the index server system 200 receives analog data or digital data so that the received multimedia data are digitally stored in a media that can randomly access.

At this time, if the input is a digital data type, no conversion step is additionally required. If the input is an analog data type, a module for conversion to digital data is required.

Furthermore, to provide search and browsing services based on the received index data at a desired time, the subscriber equipment 300 may store the index data provided from the index server system 200 in a nonvolatile memory.

The subscriber equipment 300 requires a communication interface means for logging on the index server system 200 through an access means 500 constituted by a separate network and a program module for obtaining the index data by accessing to the index server system 200. The index server system 200 also requires a communication interface means for providing the index data through the access means 500 constituted by a separate network and a program module for providing the index data requested from the subscriber equipment 300.

Figure 3:
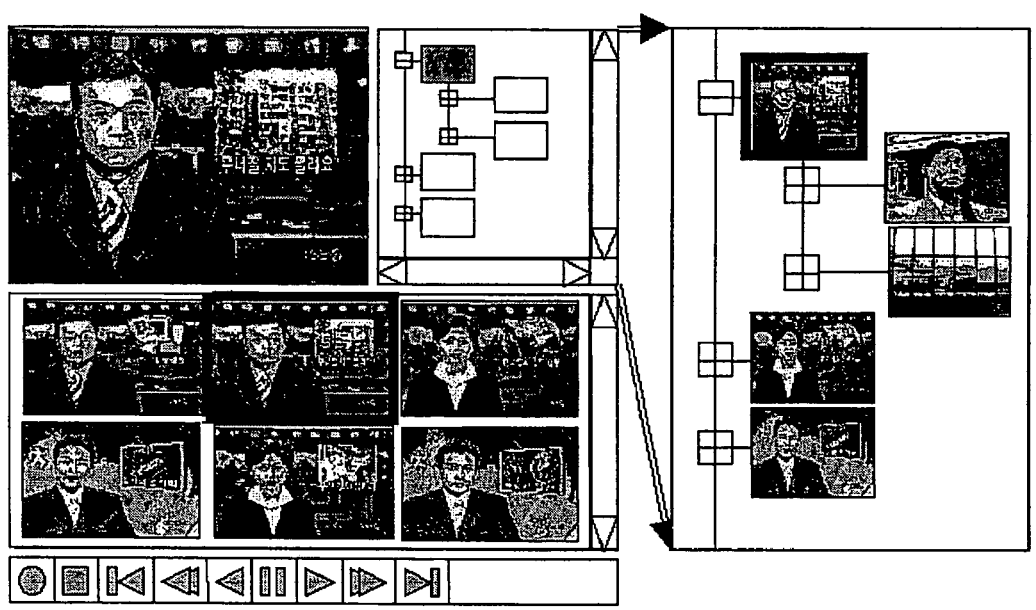
FIG. 3 shows an example of a non-linear video browsing interface based on a indexing technique.

FIG. 3 shows an example of a non-linear video browsing interface based on video indexing technique which will be used for the subscriber equipment 300.

A method for providing index data in the system of the present invention will be described below.

In the index server system 200, the extracted index data are provided to the subscriber equipment 300. To this end, in the same manner as the data server system 100, the index data are provided in a broadcasting type. Also, the index data are provided to the subscriber equipment 300 accessed through the access means 500 constituted by a network in the index server system 200.

In the broadcasting type, the user has only to pay service fee to a provider of the index server system 200 without paying a separate communication fee. In this case, a problem arises in that it is necessary to receive the index data at a broadcasting time of the index server system 200. At this time, the index server system 200 can provide the index data of multi-channels in a multiplex type.

On the other hand, in case where the user obtains the index data by accessing to the index server system 200, the user has to pay a separate communication fee but can obtain desired index data at a desired time.

In the broadcasting type, the index server system 200 provides the index data to a number of specific users only. To this end, the index server system 200 encodes the index data to prevent the index data from being used by unauthorized users.

In this case, the index server system 200 includes an encoder that encodes the index data. The subscriber equipment 300 includes a decoder that decodes the index data received from the index server system 200.

The index server system can provide the index data to the subscriber equipment 300 in various methods depending on when the broadcasting streams are provided from the data server system 100.

In case where the broadcasting streams are input at the broadcasting time in real time, the index data are extracted in real time. The extracted index data may be provided in real time in the same manner as the broadcasting streams or may be provided at a predetermined time.

Furthermore, the broadcasting streams input in real time are stored and indexed if necessary to extract the index data, so that the extracted index data may be provided at a predetermined time or may be provided by request of the users accessed through a separate network.

If the broadcasting streams are provided before broadcasting, indexing can be performed before broadcasting time. It is possible to provide the index data before the broadcasting time or in real time at the broadcasting time. Also, it is possible to provide the index data if necessary after the broadcasting time has elapsed.

As described above, the broadcasting streams can be provided before the broadcasting time or in real time at the broadcasting time. Providing the index data depends on when the index data are extracted.

In case where the user accesses through a separate network, the user obtains desired index data only. The subscriber equipment 300 accesses to the index server system 200 to obtain the index data of a real time broadcasting program or the index data of a desired broadcasting station (channel) or a desired program.

Under the circumstances, a predetermined identification (ID) number and a password are given to a specific user so that the specific user only obtains the index data. Thus, it is possible to provide authorized users with the index data service.

If streams for broadcasting are provided in advance, it is possible to generate the index data for the streams for broadcasting and perform indexing for the streams for broadcasting in real time.

Alternatively, after the broadcasting streams are recorded, the recorded data are indexed so that the index data on previously broadcasted data can be provided to desired users.

After the index data are only stored without recording the multimedia streams in the subscriber equipment 300, the index server system 200 may be requested to provide the index data. This can be realized when complete bi-directional service is available. To this end, it is necessary to establish infra and transmit/receive massive data in real time. The index server system 200 may be requested to actually edit and distribute multimedia streams. In this case, a problem related to copyrights may occur. Accordingly, in the present invention, the index data are only provided.

As described above, the system and method for providing index data of multimedia contents according to the present invention has the following advantages.

Users (viewers) can simply obtain the index data from index data service providers for streams provided from the broadcasting station or other multimedia providers. Accordingly, it is possible to perform various non-linear searches and play from the index data. This enables viewing and recording (storing) of a desired program.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A system for providing index data of multimedia contents comprising:
    a data server system for providing multimedia data to subscribers;
    an index server system for receiving multimedia streams transferred from the data server system to subscribers, extracting index data from the received multimedia streams, and providing the extracted index data to the subscribers; and a subscriber equipment for real time recording and playing the multimedia data from the data server system and providing a user interface to perform an indexed search and browsing using the index data provided from the index server system, wherein the index data extracted from the index server system are structural semantic or summary data of the multimedia streams described based on temporal data, and wherein the data server system provides the multimedia streams to the index server system before providing the multimedia streams to the subscriber equipment, and the index server system extracts the index data for the multimedia streams provided in advance and first provides only the extracted index data to the subscriber equipment before providing any multimedia contents corresponding to the extracted index data.

2. The system of claim 1, wherein the structural data of the multimedia streams include shot or scene data described based on temporal data.

3. The system of claim 1, wherein the semantic data of the multimedia streams include information on appearance or disappearance of objects, transition of background, occurrence and termination of event, semantic data of each section within the multimedia streams, and state of the object, wherein those information are described based on temporal data.

4. The system of claim 1, wherein the summary data of the multimedia streams include key frame or highlight data, or segment data related to summary/detail relationship or cause/result relationship between segments or between events, wherein such data are described based on temporal data.

5. The system of claim 1, where in the index server system includes at least one indexing engine having a program therein for automatically extracting the index data and an interface means for manually or semi-automatically extracting the index data by an operator.

6. The system of claim 1, wherein the index server system includes a transmitting means for transmitting the index data to the subscriber equipment.

7. The system of claim 1, wherein the index server system further includes an encoder that encodes the index data to provide only permitted users with the index data, and wherein the subscriber equipment includes a decoder that decodes the index data received from the index server system.

8. The system of claim 1, wherein the subscriber equipment includes a communication interface means for logging on the index server system through an access means and a program module for receiving the index data by accessing to the index server system, and wherein the index server system includes a communication interface means for providing the index data through an access means and a program module for providing the index data requested by the subscriber equipment.

9. The system of claim 1, wherein, upon request of a subscriber equipment accessed to the index sever system, only the subscriber-desired index data are provided to the subscriber equipment at the time the subscriber requested.

10. A method for providing index data of multimedia contents to subscribers, comprising:
receiving multimedia streams from a data server system of a multimedia contents provider;
extracting the index data of the multimedia streams provided from the data server system of the multimedia contents provider; and
providing the index data extracted from an index server system to subscriber equipments, wherein the index data extracted from the index server system are structural, semantic or summary data of the multimedia streams described based on temporal data, and wherein the data server system of the multimedia contents provider provides the multimedia streams to the index server system before providing the multimedia streams to the subscriber equipment, and the index server system extracts the index data for the multimedia streams provided in advance and first provides only the extracted index data to the subscriber equipment before providing any multimedia contents corresponding to the extracted index data.

11. The method of claim 10, wherein the extracting the index data is automatically performed using an indexing engine.

12. The method of claim 10, wherein the extracting the index data is manually performed by an operator.

13. The method of claim 10, wherein the extracting the index data is semi-automatically performed by combining an automatic extracting system based on an indexing engine and a manual extracting system by an operator.

14. The method of claim 10, wherein the index data provided to the subscriber equipments are multiplexed index data of streams provided from various multimedia contents providers.

15. The method of claim 10, wherein the providing the index data further includes encoding of the index data.

16. The method of claim 10, wherein the index data are extracted in real time for multimedia streams provided from the data server system of the multimedia contents provider to the subscriber equipment.

17. The method of claim 10, wherein the index server system stores the multimedia streams provided from the data server system of the multimedia contents provider to the subscriber equipment, and extracts the index data by indexing the multimedia streams when the index data are provided to the subscriber equipment.

18. The method of claim 10, wherein the extracted index data are provided to the subscriber equipment in a predetermined time.

19. The method of claim 10, wherein, upon request of a subscriber equipment accessed to the index server system, only the subscriber-desired index data are provided to the subscriber equipment at the time the subscriber requested.

20. The method of claim 10, wherein the structural data of the multimedia streams include shot or scene data described based on temporal data.

21. The method of claim 10, wherein the semantic data of the multimedia streams include information on appearance or disappearance of objects, transition of background, occurrence and termination of event, semantic data of each section within the streams, and state of the object, wherein those information are described based on temporal data.

22. The method of claim 10, wherein the summary data of the multimedia streams include key frame or highlight data, or segment data related to summary/detail relationship or cause/result relationship between segments or between events, wherein such data are described based on temporal data.

* * * * *